United States Patent [19]
Hayes et al.

[11] Patent Number: 5,689,862
[45] Date of Patent: Nov. 25, 1997

[54] SAFETY CLAMP

[75] Inventors: Glenn P. Hayes, Bedford; Mark D. Matzner, Burleson, both of Tex.

[73] Assignee: SPM, Inc., Fort Worth, Tex.

[21] Appl. No.: 643,239

[22] Filed: May 2, 1996

[51] Int. Cl.⁶ .................................................. A44B 11/25
[52] U.S. Cl. ......................... 24/284; 24/279; 24/335; 405/170; 248/65
[58] Field of Search ................. 24/335, 279, 284, 24/19, 282, 20 LS; 285/117; 403/2, 11; 405/168.1, 169, 170; 166/297, 298, 55, 75.11, 77.1; 248/61, 65, 72

[56] References Cited

U.S. PATENT DOCUMENTS

| | | | |
|---|---|---|---|
| 375,464 | 12/1887 | Thacher et al. | 405/170 |
| 580,226 | 4/1897 | Sanford | 405/170 |
| 2,746,773 | 5/1956 | Bily | 285/117 |
| 3,341,232 | 9/1967 | Deakins | 24/279 |
| 3,467,224 | 9/1969 | Curtis et al. | |
| 3,594,835 | 7/1971 | Wilson. | |
| 3,813,733 | 6/1974 | Flohr | 24/279 X |
| 4,059,872 | 11/1977 | Delesandri | 24/284 |
| 4,338,707 | 7/1982 | Byerly | 24/20 LS X |
| 4,445,255 | 5/1984 | Olejak | 24/284 |
| 4,485,530 | 12/1984 | Begley et al. | 24/279 X |
| 4,864,696 | 9/1989 | Mittermaier et al. | 403/2 X |
| 4,915,418 | 4/1990 | Palatchy | 24/284 X |
| 5,507,533 | 4/1996 | Mumma | 285/117 X |

FOREIGN PATENT DOCUMENTS

| | | | |
|---|---|---|---|
| 649744 | 6/1992 | Australia | 24/19 |
| 2117822 | 2/1983 | United Kingdom. | |

OTHER PUBLICATIONS

Venture Oilfield Services Ltd. Drawing titled: Flowline's Safety Clamp.

*Primary Examiner*—James R. Brittain
*Assistant Examiner*—Hanh V. Tran
*Attorney, Agent, or Firm*—James E. Bradley

[57] ABSTRACT

A safety device is provided for a high-pressure flow line that is formed from sections of pipe that are coupled together. The safety device is formed from a pipe clamp having two halves that are coupled together about one of the pipe sections so that the pipe section is securely held between the two halves of the clamp. A cable is positioned generally along the length of the flow line. A cable engagement portion is joined to one of the two halves of the clamp and has a slot for receiving the cable. A removable slot closure retains the cable within the slot. In one embodiment, a resilient insert can be releasably coupled to the clamp to bear against the exterior of the pipe sections when the clamp is secured thereto.

14 Claims, 2 Drawing Sheets

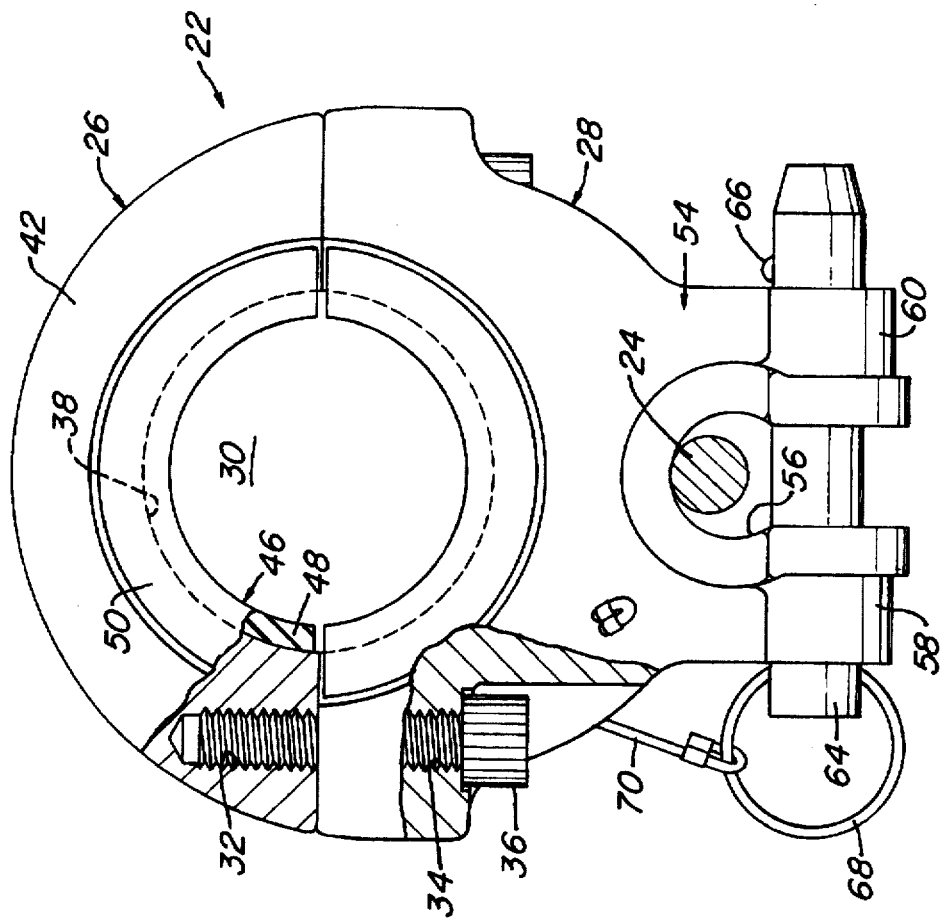
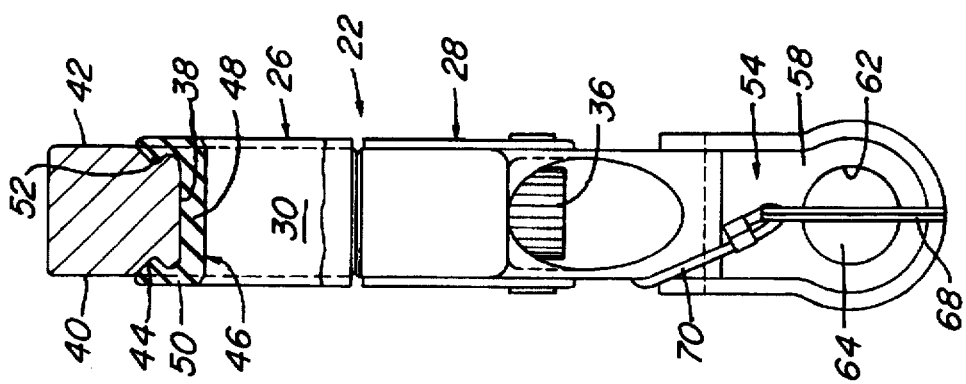

SAFETY CLAMP

BACKGROUND OF THE INVENTION

1. Field of the Invention

This invention relates to a safety device for a high-pressure flow line.

2. Description of the Prior Art

In oil and gas wells, it is often necessary to stimulate the well in order to increase its production. One method is to fracture the producing formation by introducing fluids into the well under extremely high pressure. The high-pressure fluids damage the formation by creating cracks or fissures causing the oil or gas to flow more freely from the formation. This allows more oil and gas to be produced from the well.

The flow lines used for these operations must be able to withstand the high pressures of the fracturing fluids that are introduced into the well. The flow lines are usually only temporarily connected to the well head for the duration of the fracturing operation. Even though the flow lines may be designed to withstand high pressures, ruptures in the pipe and coupling failures may still occur. Because of the danger associated with pumping these high pressure fluids, safety precautions must be taken to minimize the hazards created when failures do occur. Breaks in the pipeline used for conducting the pressurized fluids to the wellhead can result in the uncontrolled flailing or whipping of the pipe as the high-pressure fluid escapes. This creates an extreme hazard to any surrounding persons, equipment or structures.

By anchoring the pipeline at selected locations along its length, movement of the broken pipeline can be stopped or minimized. One method of anchoring the pipeline involves positioning pipe clamps near the ends of each pipe section. The clamps are provided with a bore through which a steel cable is threaded. In this way a series of clamps can be anchored with only a single length of cable. The cable is then secured at the ends to a suitable anchoring structure. Permanently bonded to each of the clamps is a layer of elastomeric material that seats against the exterior of the pipe.

It may sometimes be necessary to replace the clamps. Often, the bonded layer of elastomeric material becomes worn or damaged so that the entire clamp must be replaced. In order to replace one of the clamps, the steel cable must be unthreaded from the adjacent clamps until the affected clamp is free. The damaged clamp is then removed and replaced, and the cable rethreaded through the remaining clamps.

SUMMARY OF THE INVENTION

A safety device is provided for a high-pressure flow line that is formed from sections of pipe that are coupled together. The safety device is formed from a pipe clamp having two halves that are coupled together about one of the pipe sections so that the pipe section is securely held between the two halves of the clamp. A cable is positioned generally along the length of the flow line. A cable engagement portion is joined to one of the two halves of the clamp and has a slot for receiving the cable. A removable slot closure retains the cable within the slot. In one embodiment, a resilient insert can be releasably coupled to the clamp to bear against the exterior of the pipe sections when the clamp is secured thereto.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 2 is a side view of a pipe clamp of the safety device of FIG. 1, shown partially sectioned and constructed in accordance with the invention; and FIG. 3 is a front view of the pipe clamp of FIG. 3, shown partially sectioned.

DETAILED DESCRIPTION OF THE PREFERRED EMBODIMENT

Figure 1:
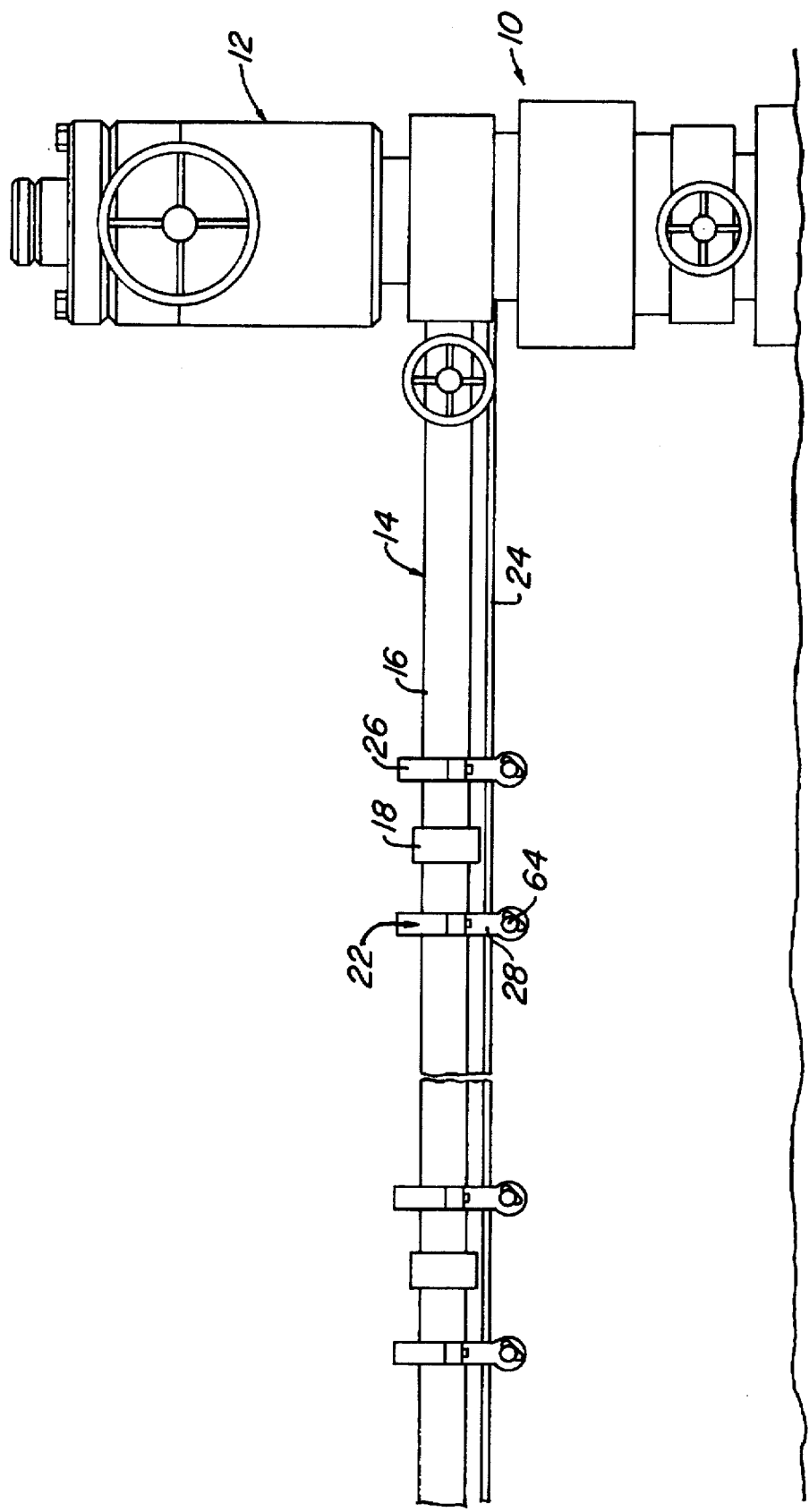
FIG. 1 is a side view of a high-pressure flow line feeding into a well head of an oil and gas well, shown with a safety device constructed in accordance with the invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

Referring to FIG. 1, an oil or gas well designated generally at 10 is provided with a Christmas tree 12 where fluids may be delivered to and from the well. A temporary high-pressure flow line 14 is coupled to and in fluid communication with the tree 12 for supplying high-pressure fluids to the well 10 during fracturing operations.

The flow line 14 is formed from a plurality of pipe or tubing sections 16 that are joined together at the ends by collars or unions 18. Pipe clamps 22 are secured to each pipe section 16 adjacent to the ends. A length of steel wire cable or rope 24 passes to each pipe clamp 22 and is coupled thereto. The length of cable 24 is anchored at each end to a suitable anchoring structure.

Referring now to FIGS. 2 and 3, the pipe clamps 22 are formed into two separate sections or halves 26, 28. The sections 26, 28 may be of solid cast or machined steel. Each section 26, 28 is provided with an arcuate-shaped recess 30 configured to provide a circular opening of the clamp 22 so that, together, the sections 26, 28 fit about the entire diameter of the pipe 16 when the sections 26, 28 are coupled together. Formed in each section 26, 28 are threaded bores 32, 34, respectively, for receiving a threaded bolt 36 to fasten the two sections 26, 28 together. It should be apparent to those skilled in the art, however, that other means may be used for coupling the sections 26, 28 together.

Each section 26, 28 has an inwardly facing contact surface 38 that defines the recess 30. Opposite sidewalls 40, 42 of the sections 26, 28 extend from the contact surface 38. Formed in each sidewall 40, 42 are grooves 44 that are generally parallel with the contact surface 38.

Provided with each section 26, 28 is an elastomeric insert 46. While the insert may be formed from a variety of materials having different densities and hardnesses, polyurethane having a hardness of about 80 durometer has been found to be suitable. The elastomeric insert 46 has a unitary construction with a generally U-shaped cross section and is configured to overlay the contact surface 38 of recess 30 of each clamp half 26, 28, as shown in FIG. 2. A contact portion 48 of the insert 46 overlays the contact surface 38 and bears against the exterior surface of the pipe when the clamp 22 is fastened thereto. Side portions 50 of the insert overlay the sidewalls 40, 42 so that inwardly projecting lips 52 of the insert 46 are received within the grooves 44. The resiliency of the elastomeric material retains the lips 52 within the grooves 44 so that the insert 46 is effectively secured to each section 26, 28. By manually pulling the lips 52 from the grooves 44, the insert 46 may be easily removed for replacement.

Integrally formed with the lower section 28 is a cable engagement portion 54 having a slot 56 defined by opposite legs 58, 60 that are spaced apart a far enough distance to receive the cable 24. Formed in each leg 58, 60 are concentrically aligned bores 62. A retaining pin 64 is received within the bores 62 and extends across the slot 56 to close off the slot 56 so that the cable 24 is retained therein. The retaining pin 64 is provided with a retractable detent 66 at one end and a keeper 68 at the other for maintaining the pin 64 within the bores 62 of each leg 58, 60. A line 70 secured to the lower half 28 of the clamp 22 and attached to the pin 64 prevents loss of the pin 64 from the clamp 22.

In use, the clamps 22 are secured to the flow line 14 near the ends of each pipe section 16. The two halves 26, 28 are brought together about the pipe and coupled together by means of the fasteners 36 so that the pipe 16 is securely held between the two halves 26, 28. The anchored steel cable 24 is then positioned within the slot 56 of each clamp 22. With a portion of the cable 24 positioned within the slot 56, the retaining pin 64 is passed through the bores 62 of the legs 58, 60 of the cable engagement portion 56 so that the slot 56 is closed off. The keeper 68 and detent 66 maintain the pin 64 in position within the bores 62. The cable 24 is thus effectively secured to the flowline 14 by means of the clamps 22.

In case the flowline 14 ruptures or breaks, the anchored steel cable 24 will prevent the uncontrolled flailing or movement of the pipe 14 as the high pressure fluid escapes.

The safety device of the invention has several advantages. The elastomeric insert can be easily removed and replaced. Because the insert is not bonded to the clamp, if the insert becomes damaged only the insert must be replaced. Inserts of different thicknesses may also be used with the same clamp to accommodate pipes of different diameters.

If it is necessary to replace one of the clamps along the flow line, the retaining pin is merely removed from the slot of the desired clamp and the clamp is unbolted and replaced with a new one. There is no need to pull or unthread the entire cable from the clamps and rethread them once the desired clamp is replaced.

While the invention has been shown and described in only one of its forms, it should be apparent to those skilled in the art that it is not so limited but is susceptible to various changes without departing from the scope of the invention.

We claim:

1. A safety device for a high-pressure flow line formed from sections of pipes that are coupled together, the device comprising:

a pipe clamp formed into two halves that are configured to couple together about one of the pipe sections, the two halves of the clamp each having a recess configured to correspond to the exterior shape of said one of the pipe sections so that said one of the pipe sections is securely held between the two halves when coupled together, and wherein there are two insert grooves each formed on opposite sides of each half of the clamp adjacent to the recess;

a cable for positioning generally along the length of the flow line;

a cable engagement portion joined to one of the two halves, the cable engagement portion having a slot formed therein for receiving the cable, the engagement portion also having a bore generally transverse in relation to the slot; and a removable slot closure for retaining the cable within the slot, the slot closure including a pin that is passed through the bore of the engagement portion to close off the slot so that the cable is retained therein.

2. The device of claim 1, further comprising:

a releasable, resilient insert formed in two sections, each of the two sections overlaying one of the recesses of the clamp halves, each section having lips that project into the grooves so that each section is maintained in position over said one of the recesses without adhesion or bonding so that the two sections are releasably held in place over the recesses with the insert bearing against the exterior of said one of the pipe sections when the clamp is secured to said one of the pipe sections.

3. The device of claim 2, wherein:

the resiliency of the insert allows the insert to be deformed so that the lips can be pulled from the grooves for removal of the insert.

4. The device of claim 2, wherein a contact surface of the clamp halves defines the recess, and opposite sidewalls extend from the contact surface with the insert grooves being formed in the opposite sidewalls; and each section of the insert has a contact portion that overlays the contact surface and side portions that extend from either side of the contact portion that overlay the sidewalls, and wherein the lips project inward from the side portions into the grooves formed in the opposite sidewalls.

5. The safety device of claim 2, wherein:

the resilient insert is formed from an elastomeric material.

6. The safety device of claim 5, wherein:

the resilient insert has a durometer hardness of approximately 80.

7. The safety device of claim 1, wherein:

the pin has retaining means for maintaining the pin within the bore.

8. A method for anchoring a high-pressure flow line formed from sections of pipes that are coupled together, the method comprising:

providing a pipe clamp formed into two halves that are configured to couple together about one of the pipe sections, the two halves of the clamp each having a recess configured to correspond to the exterior shape of said one of the pipe sections so that said one of the pipe sections is securely held between the two halves when coupled together, and wherein there are two insert grooves each formed on opposite sides of each half of the clamp adjacent to the recess;

positioning a cable generally along the length of the flow line;

providing a cable engagement portion joined to one of the two halves, the cable engagement portion having a slot formed therein for receiving the cable, the engagement portion having a bore;

providing a removable slot closure for retaining the cable within the slot, the slot closure including a pin that is passed through a bore of the engagement portion to close off the slot so that the cable is retained therein; and providing releasable, resilient inserts formed in two sections, each of the two sections for overlaying one of the recesses of the clamp halves, each section having lips that project into the grooves when the sections of the insert are mounted to the clamp halves so that each section is maintained in position over said one of the recesses without adhesion or bonding so that the two sections are releasably held in place over the recesses, and wherein the inserts are provided with different thicknesses to accommodate pipe sections of different diameters;

selecting one of the inserts having a desired thickness for use with a selected pipe section of a given diameter forming the flow line;

mounting the sections of the selected insert to the clamp halves; and coupling the clamp halves to the selected pipe section;

positioning the cable within the slot of the cable engagement portion of the clamp; and then passing the pin through the bore of the engagement portion to close off the slot so that the cable is retained therein.

9. The method of claim 8, wherein the resiliency of the insert allows the insert to be deformed so that the lips can be pulled from the grooves for removal of the insert.

10. The method of claim 9 wherein:

a contact surface of the clamp halves defines the recess, and opposite sidewalls extend from the contact surface with the insert grooves being formed in the opposite sidewalls; and each section of the insert has a contact portion that overlays the contact surface and side portions that extend from either side of the contact portion that overlay the sidewalls, and wherein the lips project inward from the side portions into the grooves formed in the opposite sidewalls.

11. The method of claim 8, wherein:

the resilient insert is formed from an elastomeric material.

12. The method of claim 11, wherein:

the resilient insert has a durometer hardness of approximately 80.

13. The method of claim 8, wherein:

the pin has retaining means for maintaining the pin within the bore.

14. The method of claim 8, wherein:

positioning the cable along the length of the flow line also includes anchoring the cable at each end to an anchoring structure.

* * * * *